United States Patent [19]
Reinecke

[11] 3,918,767

[45] Nov. 11, 1975

[54] ANTISKID VEHICLE BRAKE SYSTEM FOR INDIVIDUAL WHEEL CONTROL INCLUDING A FLUID PRESSURE COMPARATOR DEVICE

[75] Inventor: Erich Reinecke, Beinhorn, Germany

[73] Assignee: WABCO Westinghouse G.m.b.H., Hannover, Germany

[22] Filed: Apr. 4, 1974

[21] Appl. No.: 457,819

[30] Foreign Application Priority Data
June 29, 1973  Germany............................ 2333127

[52] U.S. Cl. ................ 303/21 A; 303/21 F; 303/68
[51] Int. Cl.² .......................................... B60T 8/02
[58] Field of Search .......... 303/21 F, 21 EB, 61–63, 303/68–69, 21 BE, 21 A; 188/181 A; 200/81 R, 82 D

[56] References Cited
UNITED STATES PATENTS

| | | | |
|---|---|---|---|
| 3,650,573 | 3/1972 | Inada et al. ......................... | 303/21 F |
| 3,706,635 | 12/1972 | Neisch ............................... | 303/21 EB |
| 3,768,874 | 10/1973 | Riordan ............................. | 303/21 BE |

*Primary Examiner*—Trygve M. Blis
*Assistant Examiner*—Douglas C. Butler
*Attorney, Agent, or Firm*—R. W. McIntire, Jr.

[57] ABSTRACT

An electronic antiskid brake control system for effecting adjustment of brake pressure on the individual wheels of a common axle of a vehicle independent of the operator controlled brake pressure in such a manner that when a predetermined brake pressure difference arises between the respective wheels, due to the skidding of one wheel, the higher wheel brake pressure is adjusted so as to prevent the brake pressure difference from exceeding the predetermined difference. In one embodiment, a control piston subject to the different wheel brake pressures operates a switch armature between a pair of electrical contacts via which one or the other of modulating valves in the respective wheel brake lines is energized when the predetermined brake pressure difference arises. In a second embodiment, a pressure limiting valve subject to the different wheel brake pressures is connected in each brake line between the modulating valve and brake cylinder to adjust the brake pressure of that wheel when the other wheel brake pressure is greater by the predetermined brake pressure difference. Until this predetermined brake pressure difference develops, the non-skidding wheel in each of the above embodiments produces normal braking to obtain good stop distances, while steering stability is maintained by limiting the brake pressure difference in excess of that which is considered unsafe.

10 Claims, 5 Drawing Figures

ANTISKID VEHICLE BRAKE SYSTEM FOR INDIVIDUAL WHEEL CONTROL INCLUDING A FLUID PRESSURE COMPARATOR DEVICE

BACKGROUND OF THE INVENTION

The present invention is concerned with vehicle brake systems of the type arranged to provide individual wheel anti-skid control. Such arrangements are well known to provide for adjustment of the normal wheel brake pressure according to the adhesion level at each particular wheel, in order to realize the maximum brake capacity possible at each wheel under existing road conditions. This individual wheel brake control has the advantage of providing the shortest stopping distance of the vehicle, but is also known to have the disadvantage of creating disproportionate brake forces at the respective wheels of a common axle, such as the steering wheels, for example. This is known to cause sudden vehicle swerving when a wheel on one side of the vehicle encounters a particularly poor or slippery road surface, while the wheel on the other side is experiencing normal road adhesion. On vehicles with short wheel bases, particularly, severe vehicle lashing and steering instability result, due to the panic reaction of the operator in attempting to counter steer the vehicle.

To avoid such yawing forces where the vehicle steering wheels are running on a road surface having different friction characteristics, arrangements have been devised which control adjustment of the normal braking pressure of the respective wheels according to the dynamic characteristics of the wheel running on the poorer road surface. Obviously, this prevents the wheel running on the better road surface from attaining its optimum brake pressure and accordingly increases the vehicle stopping distance, albeit the vehicle steering stability is improved. It will be appreciated, therefore, that in attempting to improve the vehicle safety from the standpoint of better steering stability, the vehicle stopping distance is compromised and the vehicle safety is in fact jeopardized.

SUMMARY OF THE INVENTION

It is accordingly, the object of the present invention to provide an individual wheel antiskid brake control system having means for comparing the brake pressures of individual wheels of a common axle and influencing the wheel having the higher brake pressure only when a predetermined differential exists between the individual wheel brake pressures.

It is another object of the invention to provide the above comparison means in the form of a single differential pressure switch whose actuating piston is subject opposingly to the brake pressure of the individual wheels.

Still another object of the invention is to provide the comparison means in the form of a pair of fluid pressure differential control valves, each disposed in the respective brake cylinder delivery lines and subject to the different wheel brake pressures for controlling the brake pressure of a respective one of the wheels.

In accordance with these objects, there is provided in one embodiment of the invention a differential pressure switch subject on opposite sides of its actuating piston to fluid brake pressure supplied to the respective wheel brake cylinders via modulating valves in the brake cylinder delivery lines leading from a conventional operator controlled brake valve device. The actuating piston is shifted out of a neutral position in response to a pressure differential and establishes an electrical contact via which a pilot actuator of the modulating valve associated with the higher brake pressure is operated when a predetermined pressure differential between the respective wheels occurs. The higher brake cylinder pressure buildup is then either restricted, stopped entirely so that brake pressure is held constant or else the brake pressure is exhausted via the modulator valve to limit the brake pressure differential between the respective wheels to a value above which steering stability becomes a problem.

In a second embodiment, there is provided a pair of identical differential pressure actuated control valves, each disposed in the brake cylinder delivery line of a respective one of the wheels. Each control valve comprises an actuator piston operative responsive to a differential between the respective wheel brake pressures and valving controlled by the actuator piston when a predetermined brake pressure differential exists to restrict brake pressure buildup, interrupt it entirely or if necessary exhaust the brake pressure of the cylinder having the higher brake pressure.

Other objects and advantages of the present invention will become more apparent from the following description when taken with the accompanying drawings of which:

DESCRIPTION AND OPERATION

Figure 1:
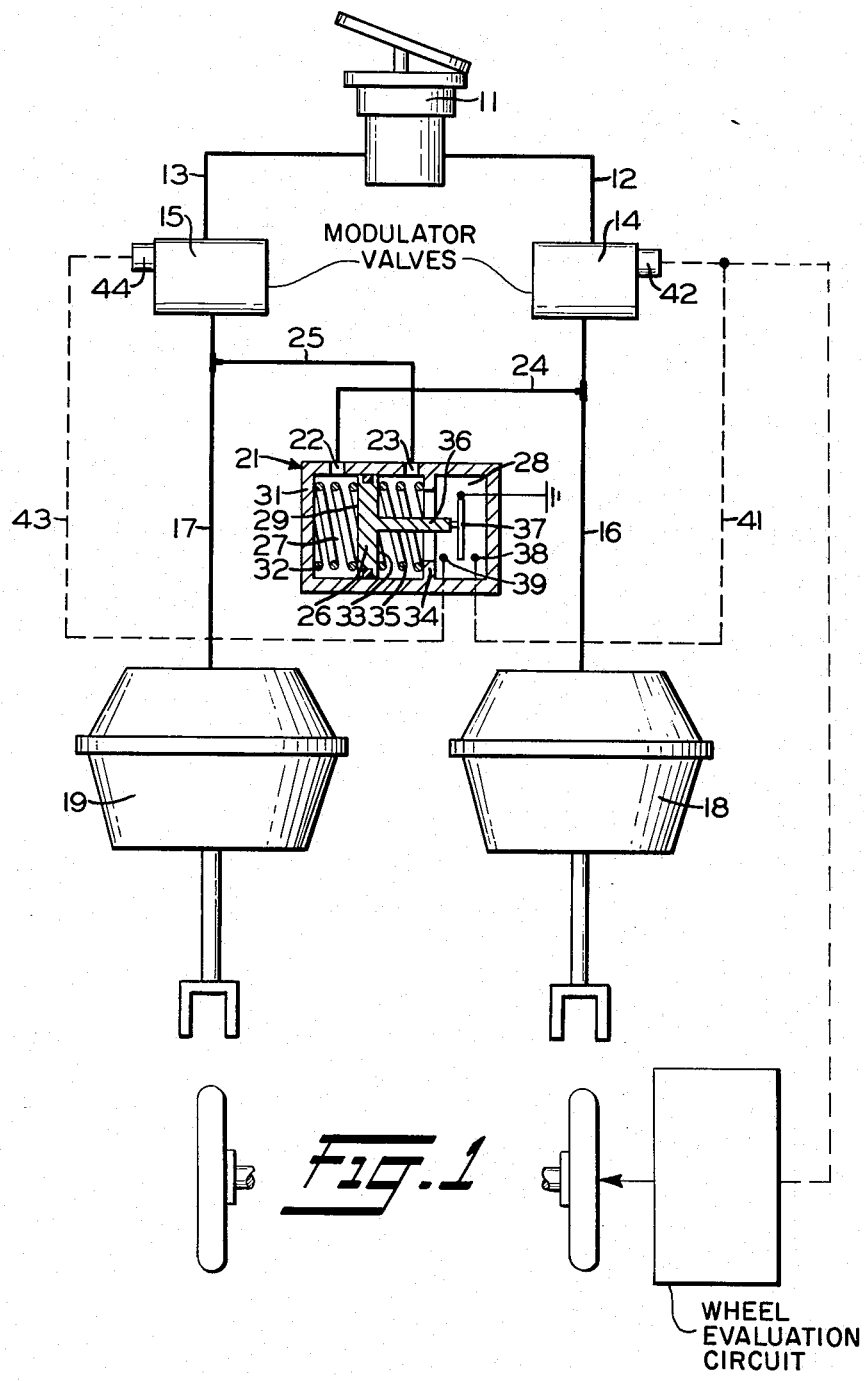
FIG. 1 shows an arrangement of the invention employing an electro-pneumatic differential pressure switch.

Referring now to FIG. 1, there is shown a conventional operator's foot valve device 11 with lines 12 and 13 leading therefrom to a modulator valve 14 and 15, respectively. These modulator valves may be controlled to adjust the pressure from foot valve 11 in accordance with output signals from an evalvation circuit, one function of which is to recognize a rate of wheel deceleration consistent with an impending skid condition of the wheel with which it is associated, such function being well known. Lines 16 and 17 lead from the respective modulator valves 14 and 15 to a right wheel brake cylinder 18 and a left wheel brake cylinder 19. An electro-pneumatic differential pressure switch 21 is provided with ports 22 and 23 via which respective branch lines 24 and 25 of lines 16 and 17 are connected.

Pressure switch 21 comprises a switch actuating piston 26 that divides the casing of pressure switch 21 into a pressure chamber 27 having port 22 and a pressure chamber 28 having port 23. Disposed in chamber 27 between face 29 of piston 26 and wall 31 is a spring 32. Likewise disposed in chamber 28 between face 33 of piston 26 and a flange 34 is a spring 35, so that when the pressure supplied to chambers 27 and 28 is equal, piston 26 is caged by springs 32 and 35 in a neutral position.

Extending from piston face 33 is an arm 36 on which a grounded electrical switch unit 37 is pivotally mounted so that the switch armature lies intermediate a pair of electric contacts 38 and 39 when piston 26 is in its neutral position. Connected to contact 38 via wire 41 is an electric pilot portion 42 of modulator valve 14 of the right wheel, while contact 39 is connected via wire 43 to pilot portion 44 of the left wheel modulator valve 15.

In operation, it will be appreciated that brake pressure introduced to each line 12 and 13 under control of the vehicle operator in accordance with manipulation of foot valve 11 is connected in parallel to brake cylinder 18 and 19 and to pressure chambers 27 and 28 of differential pressure switch 21. Assuming at the time of such brake application that the right wheel is running on a surface having a lower friction value than the surface on which the left wheel of a common axle is running, the right wheel will, of course, show a tendency to lock up or skid prior to the left wheel. Such an imminent wheel skid will be recognized, in accordance with conventional operation of wheel skid control equipment including the previously mentioned wheel evaluation circuitry, which controls energization of pilot portion 42 of modulator valve 14 in a well known fashion to reduce brake pressure in the right wheel brake cylinder 18 via line 16 and modulator valve 14. Concurrently, pressure in chamber 28 of differential pressure switch 21 is also reduced via lines 24, 16 and modulator valve 14.

As pressure in chamber 28 is being reduced, it is to be understood that normal buildup of the left wheel brake pressure continues to take place so that pressure in chamber 27 of differential pressure switch 21 is increasing to produce a pressure differential across piston 26. This pressure differential results in movement of piston 26 in a direction to progressively compress spring 32 as spring 35 is expanded. The values of springs 32 and 35 are such that when a predetermined pressure differential exists, the armature of switch unit 37 will be pulled leftward by piston 26 sufficiently to engage contact 39. This establishes an electrical circuit via which pilot portion 44 is energized to accordingly operate modulator valve 15 (independent of control under the influence of the evaluation circuitry) in such sense as to terminate further supply of brake pressure via line 13 and to exhaust brake pressure via line 17.

Operation of modulator valve 15 under control of differential pressure switch 21 at the time modulator valve 14 has reduced the right wheel brake pressure a predetermined amount more than the left wheel brake pressure, thus limits the maximum brake pressure difference between the respective left and right wheels to a value which experience has shown will not create steering instability. Furthermore, in allowing normal development of the left wheel brake pressure prior to the time the predetermined brake pressure difference between the left and right wheels is established provides for maximum braking of the left wheel in accordance with the friction characteristics of the road surface on which it is running.

The pressure effective in chamber 28 of differential pressure switch 21 is reduced in parallel with the left wheel brake pressure via line 25 so that when the pressure differential between chambers 27 and 28 is restored to a level below the predetermined pressure at which it is desired to limit the wheel brake pressure difference, piston 26 will be forced back toward its neutral position in which the armature of switch 37 is removed from contact 39. Accordingly, modulator valve 15 is restored to its normal postion and the wheel brake pressures are again individually regulated until the pressure switch 21 is again actuated in either direction by reason of either wheel brake pressure being a predetermined amount less than the other wheel brake pressure.

Figure 2:
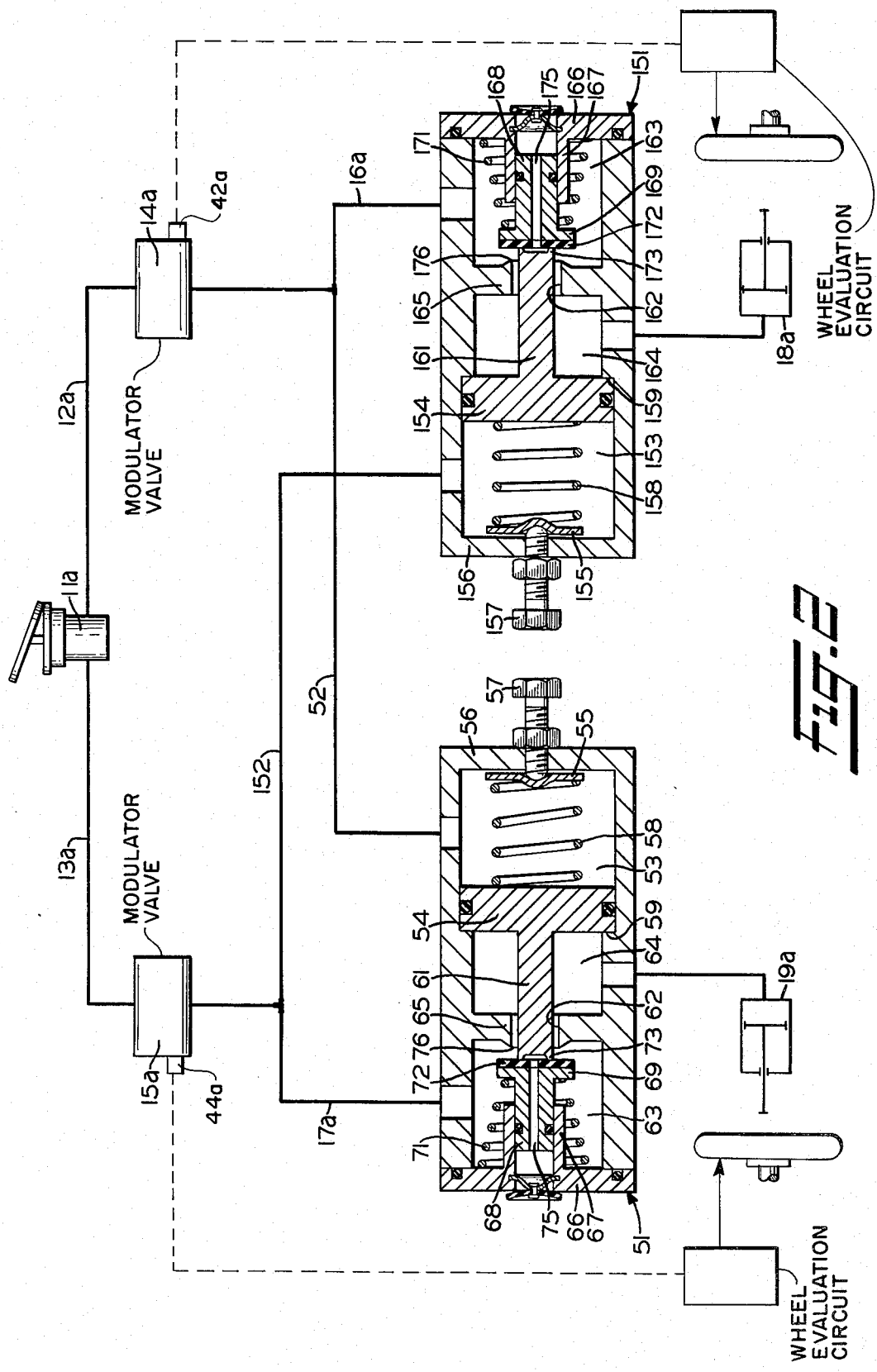
FIG. 2 shows an alternate arrangement employing a pair of identical differential pressure limiting valves.

In the embodiment of FIG. 2, there is shown an operator's foot valve device 11a, with lines 12a and 13a leading therefrom to a modulator valve 14a and 15a, respectively. These modulator valves function similar to the modulator valves 14 and 15 previously discussed, for the purpose of regulating brake pressure delivered via lines 16a and 17a to the left and right wheel brake cylinders 18a and 19a when a wheel skid condition is imminent. Interposed in each delivery line 16a and 17a is a differential pressure limiting valve 51 and 151. In that these limiting valves are identical in structure, like parts are identified by reference numerals differing by 100.

A branch passage 52 of delivery line 16a leading to the right wheel brake cylinder 18a is connected to a pressure chamber 53 of the left wheel differential pressure switch 51, while a branch passage 152 of delivery line 17a leading to the left wheel brake cylinder 19a is connected to a pressure chamber 153 of the right wheel differential pressure switch 151. Pressure chamber 53, 153 is defined by the cooperative relationship of a control piston 54, 154 and the valve body. A spring 58, 158 is disposed in chamber 53, 153 between piston 54, 154 and a spring seat 55, 155 that rests against an end wall 56, 156. Spring 58, 158 is acted upon by an adjusting screw 57, 157 that extends through an opening in wall 56, 156 into engagement with the spring. On its face opposite the spring load, piston 54, 154 is provided with an arm 61, 161 that extends through a guide opening 62, 162 formed in a wall 65, 165 for actuating a valve member 68, 168. Wall 65, 165 divides the interior valve space on the left side of piston 54, 154 into two chambers 63, 163 and 64, 164 which are communicated via opening 62, 162 in the shown position of piston 54, 154. The delivery line segment 17a is connected to chamber 63, 163 and the segment at the brake cylinder is connected to chamber 64, 164.

A front end wall 66, 166 is formed with an inturned boss 67, 167 in which is provided a bore to guidably receive valve member 68, 168. Disposed between an annular shoulder 69, 169 formed at one end of valve member 68, 168 and the front end wall 66, 166 is a conical spring 71, 171 that urges a resilient valve seal 72, 172 affixed to member 68, 168 into engagement with an exhaust valve seat 73, 173 formed at the end of arm 61, 161. An axial passage 75, 175 in valve member 68, 168 communicates brake cylinder 19a, 18a with atmosphere via chamber 64, 164 whenever the exhaust valve seat 73, 173 is unseated from seal 72, 172. In that spring 58, 158 is stronger than conical spring 71, 171, this can only occur when control piston 54, 154 is actuated from its normal position enough to allow seal 72, 172 to be moved against an annular inlet valve seat 76, 176 formed about opening 62, 162 of wall 65, 165. In this position of valve member 68, 168, fluid pressure communication between pressure chambers 63, 163 and 64, 164 is interrupted by closure of inlet valve 72–76, 172–176.

In operation of the embodiment of FIG. 2, control pistons 54 and 154 of the respective pressure limiting valves 51 and 151 are each maintained, in their normal position shown, by the bias effect of springs 58 and 158, as long as the brake pressure delivered to the left and right wheels and effective in chambers 53, 153 and 64, 164 remains within a predetermined differential established by the spring bias. In this normal position, control pistons 54, 154 open inlet valves 72–76, 172–176 to establish fluid pressure communication between modulator valves 14a, 15a and brake cylinder 18a, 19a via delivery passages 16a, 17a of the right and left wheels respectively. In the absence of a wheel skid condition at either wheel, modulator valves 14a, 15a conduct normal flow of fluid pressure from lines 12a and 13a to delivery lines 16a and 17a so that the brake pressure obtained is under direct control of the operator controlling the foot valve device.

Now if it is assumed the right wheel brake pressure is reduced by the action of modulator valve 14a in response to an imminent wheel skid condition arising at the right wheel, the resulting differential brake pressure will be reflected across pistons 54 and 154 of pressure limiting valves 51 and 151. In valve 151, the differential acts in the direction of spring 158 to maintain piston 154 in its normal position shown, while the differential across piston 54 of valve 51 acts in opposition to spring 58. Piston 54 is therefore shifted rightward as the brake pressure differential increases, with spring 71 forcing valve member 68 to follow piston arm 61 so that the flow path of brake pressure to brake cylinder 19a is progressively restricted via inlet valve 72–76. If this flow restriction is insufficient to counteract the brake pressure differential, i.e., the brake pressure differential continues to increase, then sufficient rightward movement of piston 54 and valve member 68 will continue until seal 72 engages seat 76 to completely interrupt delivery of brake pressure to cylinder 19a.

In that valve member 68 is now supported by seat 76, no further rightward movement thereof is possible, so that further rightward movement of piston 54, due to a still further increase in the brake pressure differential between the right and left wheels will now result in the exhaust valve seat 73 being disengaged from seal 72 of valve member 68. This results in the brake pressure established in brake cylinder 19a being released via the open exhaust valve 72—72 and passage 75 to atmosphere.

This action of pressure limiting valve 51 thus assures that the left wheel brake pressure does not exceed the right wheel brake pressure by an amount exceeding the predetermined brake pressure difference at which steering stability is obtained. When the reduced pressure in brake cylinder 19a and chamber 64 or an increase in pressure in brake cylinder 18a and chamber 53 of pressure limiting valve 51, due to the right wheel skid being corrected, is such as to restore the wheel brake pressure differential to a value below the predetermined differential, piston 54 will be forced leftward under the influence of spring 53 to reestablish normal fluid pressure delivery to brake cylinder 19a.

It will be appreciated, of course, that in maintaining normal fluid pressure delivery to the respective brake cylinders until a predetermined differential therebetween arises due to the modulator valve of a skidding wheel effecting a reduction of that wheel brake pressure, maximum braking is maintained at the non-skidding wheel to achieve better stop distance performance, while also obtaining vehicle steering stability.

Figure 3:
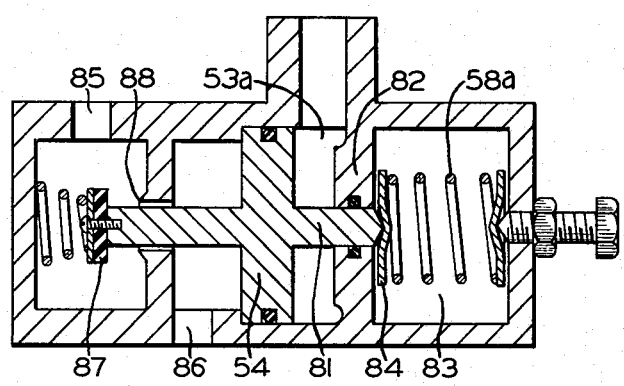
FIG. 3 shows an improved design of the differential pressure limiting valve of FIG. 2.

In FIG. 3 is shown a variation of pressure limiting valve 51, 151 in which control piston 54a is provided with an extension 81 that projects through a sealed guideway in a wall portion 82 and forms in addition to chamber 53a a separate chamber 83 in which the adjustable spring 58a is housed. Spring 58a acts through a spring seat 84 that is engageable with extension 81 to load piston 54a in a direction to disengage check valve 87 from seat 88 via which fluid brake pressure at port 85 is communicated to port 86.

This arrangement permits chamber 53a to be relatively small to reduce the effective brake cylinder clearance volume and accordingly reduce air consumption.

Figure 4:
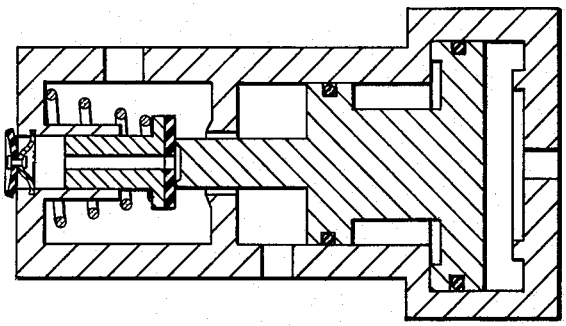
FIGS. 4 and 5 show still other variations of a pressure limiting valve.

The arrangement in FIG. 4 shows another variation of a pressure limiting valve in accordance with the invention in which the control piston is a differential area piston.

Figure 5:
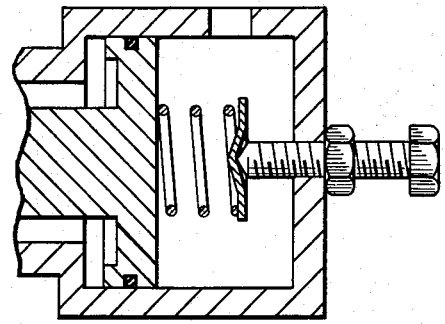

The FIG. 5 variation simply shows an adjustable spring arrangement for loading the differential piston of FIG. 4.

Having now described the invention what I claim as new and desire to secure by Letters Patent is:

1. An antiskid brake control system for a vehicle having a pair of independently rotatable wheels on a common axle of the vehicle, said system comprising:
   a. a fluid pressure actuated brake device for each of said wheels;
   b. an operator controlled foot valve device via which the brake actuating fluid pressure is selectively controlled;
   c. a brake line connecting said foot valve device with each wheel brake device to convey the brake actuating fluid pressure thereto;
   d. modulator valve means in each said brake line for modulating the fluid brake pressure at said brake device connected therewith; and
   e. evaluation means for each of said wheels operative responsive to a particular dynamic condition thereof for effecting operation of said modulator valve means of a respective wheel, wherein the improvement comprises;
   f. means for comparing the fluid brake pressure effective at said brake device of each said wheel so as to influence the higher fluid brake pressure when a predetermined difference arises therebetween.

2. The system as recited in claim 1, further characterized in that the higher wheel brake pressure is influenced in such sense as to prevent the respective wheel brake pressure differential from exceeding said predetermined difference.

3. The system as recited in claim 2, further characterized in that said means for comparing the respective wheel brake pressures is a differential pressure switch comprising:
   a. a pair of electrical switch contacts;
   b. an actuator piston subject on opposite sides thereof to said respective wheel brake pressures;
   c. spring means for biasing said actuating piston in a neutral position; and
   d. a switch armature carried by said actuating piston for engagement with one or the other of said switch contacts when said piston is moved in either direction from said neutral position to energize and thereby effect said operation of the modulator valve means of whichever wheel exhibits the higher brake pressure.

4. The system as recited in claim 3, further characterized in that said spring means loads said piston an amount corresponding to said predetermined difference between said wheel brake pressures to prevent energization of the modulator valve means associated with the higher wheel brake pressure until said brake pressure differential between the respective wheels is exceeded.

5. The system as recited in claim 1, further characterized in that said means for comparing the respective wheel brake pressures is a differential pressure limiting device disposed in the brake line of each wheel intermediate the modulator valve means and the brake cylinder of that wheel, each pressure limiting device comprising:
   a. piston valve means for controlling the brake pressure of one of the wheels in accordance with actuation to a first position in which fluid pressure communication is established between the one wheel brake cylinder and modulator valve means in response to loading of said piston valve means by the brake pressure of the other wheel and to a second position in which the one wheel brake pressure is reduced in response to loading of said piston valve means by the brake pressure of the one wheel; and
   b. bias means for loading said piston valve means toward said first position so as to delay actuation of said piston valve means from said first position to said second position until the one wheel brake pressure exceeds the other by said predetermined difference.

6. The system recited in claim 5, wherein said piston valve means comprises:
   a. a piston member having its opposite faces subject to the respective wheel brake pressures and including an extension arm on which is formed an exhaust valve seat; and
   b. a valve member separate from said piston member and having a through passage to atmosphere, said valve member in said first position being engageable with said exhaust valve seat to interrupt fluid pressure communication between said through passage and the one wheel brake cylinder and disengaged from a supply valve seat to establish fluid pressure communication between the one wheel modulator valve means and brake cylinder, and in said second position being engageable with said supply valve seat to interrupt fluid pressure communication between the one wheel modulator valve means and brake cylinder and disengaged from said exhaust valve seat to communicate said through passage with the one wheel brake cylinder.

7. The system recited in claim 6, further characterized in that said piston member in an intermediate position between said first and second positions cooperates with said valve member such that said supply and exhaust valve seats are concurrently engaged by said valve member to interrupt fluid pressure communication between the brake cylinder and both the modulator valve means and said through passage.

8. The system recited in claim 5, wherein said bias means is comprised of a spring.

9. The system recited in claim 8, further characterized in that said piston valve means is operative responsive to the respective wheel brake pressures effective in first and second chambers in which said piston valve means operates, said spring being disposed in a fluid pressure isolated third chamber into which an arm of said piston valve means extends for engagement with said spring to establish said spring load in accordance with which said piston valve means is biased toward said first position.

10. The system recited in claim 5, wherein said bias means is comprised of said piston valve means in the form of a differential piston.

* * * * *